United States Patent [19]
Engelbrecht et al.

[11] 3,940,355

[45] Feb. 24, 1976

[54] COMPOSITION AND METHOD FOR IMPARTING FIRE RESISTANCE AND WATER REPELLENCY TO FABRIC

[75] Inventors: John W. Engelbrecht; John C. Lockard, both of New Haven, Mo.

[73] Assignee: Kellwood Company, St. Louis, Mo.

[22] Filed: July 22, 1974

[21] Appl. No.: 490,485

Related U.S. Application Data

[63] Continuation-in-part of Ser. No. 416,950, Nov., 1973, which is a continuation of Ser. No. 268,041, June 30, 1972.

[52] U.S. Cl. .... 260/28.5 AV; 428/290; 260/31.2 R; 260/32.8 R; 260/33.2 R; 260/33.6 R; 260/33.8 R; 260/42.52; 260/45.75 B; 260/45.75 C; 260/45.75 W
[51] Int. Cl.² C08L 91/00; C08L 91/06; C08L 91/08
[58] Field of Search .. 260/28.5 AV, 42.52, 45.75 B, 260/45.75 C, 45.75 W, 31.2 R, 33.2 R, 32.8 R, 33.8 R, 33.6 R; 117/137

[56] References Cited
UNITED STATES PATENTS

| | | | |
|---|---|---|---|
| 3,223,662 | 12/1965 | Dreger | 260/28.5 AV |
| 3,333,970 | 8/1967 | Green | 260/28.5 AV |
| 3,619,273 | 11/1971 | Conner | 260/28.5 AV |
| 3,702,314 | 11/1972 | Farjon | 260/28.5 AV |

*Primary Examiner*—Melvyn I. Marquis
*Attorney, Agent, or Firm*—Koenig, Senniger, Powers and Leavitt

[57] ABSTRACT

A coating composition useful for imparting fire resistance and water-repellency to fabric comprises between about 5% and about 23% by weight of a liquid chlorinated paraffin, between about 20% and about 40% by weight of a resinous chlorinated paraffin, between about 4% and about 12% by weight of a copolymer of ethylene and vinyl acetate, between about 3% and about 18% by weight of a fire retardant, and up to about 15% by weight of an organic solvent. A novel water-repellent and fire resistant fabric material, and a method of preparing such material by coating tentage fabric with the composition of the invention are also disclosed.

12 Claims, 1 Drawing Figure

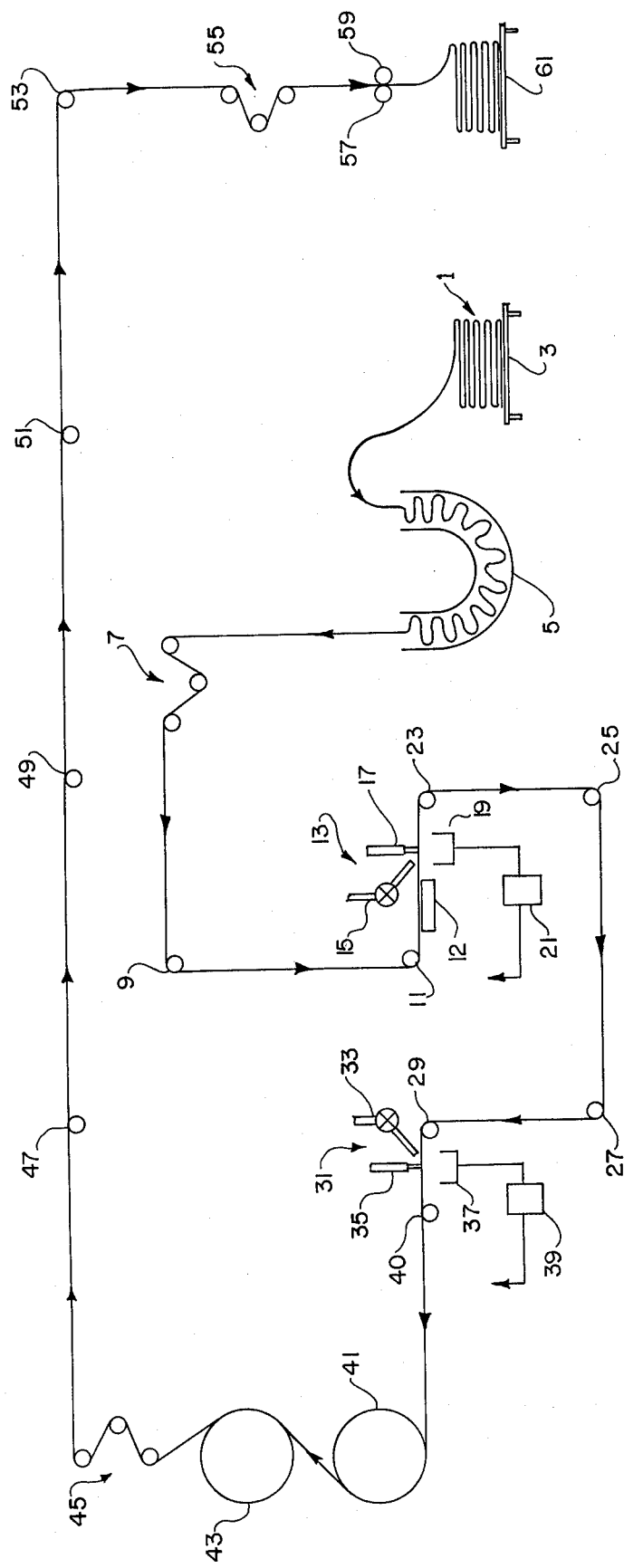

COMPOSITION AND METHOD FOR IMPARTING FIRE RESISTANCE AND WATER REPELLENCY TO FABRIC

CROSS-REFERENCE TO RELATED APPLICATION

This application is a continuation-in-part of application Ser. No. 416,950, filed Nov. 19, 1973 as a continuation of application Ser. No. 268,041, which was filed June 30, 1972 both now abandoned.

BACKGROUND OF THE INVENTION

This invention relates to the field of fire resistant fabrics, and more particularly to a coating composition and method for imparting both fire resistance and water-repellency to light weight low cost tentage fabric.

Fabrics such as tentage fabric are conventionally treated with various coatings or finishes to impart water-repellency. Such finishes are typically applied by continuously feeding a strip of the fabric under a knife blade in contact with the upper surface of the fabric and delivering either a solution of the coating material or a molten coating formulation to the surface of the fabric just ahead of the knife blade. The knife blade causes the coating material to become uniformly distributed in a thin film over substantially the entire upper surface of the fabric. A dry film is obtained by allowing the material to cool, where a molten formulation is used, or by drying where a solvent formulation is employed. In the case of solvent formulations, drying is normally accelerated by passing the freshly coated fabric through an oven.

Fire retardant finishes are applied to tentage fabric in substantially the same fashion as water-repellent finishes. Water-repellent finishes have heretofore been available which are low in cost and can be applied by knife-coating strips of fabric moving at high speed. However, the imparting of fire resistance to tentage fabric has been a more expensive proposition. Materials which provide both water-repellency and fire retardancy are known but have generally been characterized by both high formulation cost and high application cost. Essentially all of the previously known fire retardant formulations have been solvent based, water based, or plastisols and the heat load associated with the drying and/or curing of these formulations severely limits the speed at which the coating process can be conducted. Drying is accelerated by use of ovens, but oven drying adds to production cost, and even the maximum economically feasible oven drying capacity does not permit the realization of processing rates equivalent to those obtainable with a melt formulation system.

While the available technology for imparting fire retardance and water resistance is economically viable if not attractive for heavy and relatively expensive fabrics, its utilization is practically prohibitive in the case of lighter weight fabrics where the cost of a given type of finishing operation represents a significantly higher proportion of the total finished fabric cost than in the case of heavy fabrics. Because of their more open structure, moreover, it is more difficult to impart fire and water resistance to light weight fabrics than to heavier fabrics, and the need for economical fire retardant and water resistant treatment of the lighter tentage has remained substantially unfulfilled.

The provision of improved fire retardant and water-repellent finishes for tentage is complicated by the need for the fabric to satisfy a number of additional criteria. Thus, the finished material must be flexible, nonblocking, possess a good hand, and exhibit low crock. Moreover, the coating must not contain or release any agents which might tender or deteriorate the fabric over a period of time.

SUMMARY OF THE INVENTION

Among the several objects of the invention, therefore, may be mentioned the provision of methods and compositions for imparting both fire retardance and water-repellency to fabric such as tentage fabric; the provision of such compositions which are low in cost; the provision of such methods and compositions which permit a coating to be applied in a continuous operation at high speed; the provision of such compositions for which are such methods in which oven drying operations are unnecessary; the provision of such compositions and methods which are applicable to low weight and low cost fabrics; and the provision of novel coated fabrics which are fire resistant, water-repellent, flexible, nonblocking, have good weathering properties, are not subject to accelerated deterioration and possess good hand and low crock. Other objects and features of the invention will be in part apparent and in part pointed out hereinafter.

The present invention is therefore directed to a coating composition useful for imparting fire resistance and water-repellency to fabric. The composition comprises between about 5% and about 23% by weight of a liquid chlorinated paraffin, between about 20% and about 40% of a resinous chlorinated paraffin, between about 4% and about 12% by weight of a copolymer of ethylene and vinyl acetate, and between about 3% and about 18% by weight of a fire retardant and up to about 15% by weight of an organic solvent.

The invention is further directed to a method of imparting fire resistance and water-repellency to a fabric. In this process, the aforementioned composition is heated to flow temperature and delivered to a surface of a portion of fabric. The composition is uniformly applied over a predetermined area of said surface and cooled to form a thin adherent fire retardant and water-repellent film substantially covering said area of said fabric surface.

Also included in the invention is a fire resistant, water-repellent material useful for the production of tents. This material comprises tentage fabric having a substantially uniform coating of the aforementioned coating composition.

BRIEF DESCRIPTION OF THE DRAWING

The single FIGURE is a schematic diagram illustrating the process of the invention.

DESCRIPTION OF THE PREFERRED EMBODIMENTS

The coating compositions provided in accordance with the present invention are melt formulations which can be applied to the surface of tentage fabric and rapidly dried to produce an adherent coating which imparts both water-repellency and fire resistance to the fabric. The film-forming properties of the composition make it especially suitable for coating low weight, low thread count fabrics. Compared with many previously available fire retardant coating compositions for fabrics, the cost of the compositions of the invention is relatively low. Taken together with the high processing speed made possible by rapid drying, the low cost of the compostion allows even low weight fabrics to be rendered water-repellent and fire resistant without inordinate increase in the cost of the finished fabric.

The finished fabric is possessed of superior weathering properties and meets essentially all the flammability standards required by state and federal regulations. In particular, the coated fabric of the invention has been found to meet the relatively stringent fire resistance standards established by the California Fire Marshal as set forth in Title 19, Article 3, Sections 1210 to 1237.3 of the California Administrative Code. The coating does not add excessively to the weight of the fabric and the coated material retains a highly satisfactory degree of flexibility and good hand. The coated material is further characterized by low crock and nonblocking properties and is not tendered or otherwise deteriorated by any component of the coating composition, or any agent released therefrom.

The essential components of the compositions of the invention are a liquid chlorinated paraffin, a resinous chlorinated paraffin, a copolymer of ethylene and vinyl acetate and a fire retardant. Resinous chlorinated paraffins are known to have advantageous water-repellent and fire retardant properties but are also known to be either highly tacky or quite brittle and slightly tacky and thus unsatisfactory per se for use as tentage fabric coatings. Applicants have discovered that incorporation of a copolymer of ethylene and vinyl acetate in a composition containing certain proportions of both liquid and resinous chlorinated paraffins yields a composition which forms a film that is substantially more flexible than the resinous chlorinated paraffin, yet is also free from tackiness. The plastic properties of the film are also improved. It has further been discovered that such a system is compatible with a wide variety of fire retardants whose inclusion provides an overall composition which may be applied to fabric as a melt formulation affording both a high degree of water-repellency and highly satisfactory fire resistance to the fabric.

It is essential that both a liquid chlorinated paraffin and a resinous chlorinated paraffin be incorporated in the compositions of the invention. The liquid chlorinated paraffin may typically have a viscosity of between about 5 and about 80 poises at 25°C. but the only essential requirement is that it be liquid at room temperature. The chlorine content of the liquid chlorinated paraffin may vary widely and fully satisfactory liquid chlorinated paraffins containing on the order of 40% to 70% by weight chlorine, are commercially available. The preferred liquid chlorinated paraffin for use in the practice of the invention is a product having a chlorine content of approximately 42% by weight, a molecular weight of approximately 560, a Brookfield viscosity at 25°C. of 31 poises, a specific gravity at 25°C./25°C. of 1.16 and heat stability of 0.050 sold under the trade designation "Chlorowax 40" by Diamond Alkali Company. Other satisfactory liquid chlorinated paraffins include those sold under the trade designations "Chlorowax 500C", "Chlorowax LV" , "Exchlor 1", "Exchlor 2", "Exchlor 3", "Chlorowax 57–60", "Chlorowax 43–150", "Chlorowax 42–170", "Chlorowax 45–175", and "Diablo 700X" all by Diamond Alkali Company, chlorinated paraffin "400-HV" by Diamond Shamrock Corporation, "Neochlor 70L" by Nease Chemical Co., Inc., "Unichlor I-40" by Neville Chemical Company, "Chlorafin 40" by Hercules Powder Company and "CP-468" chlorinated aliphatic by Hooker Chemical Corporation. At least 5% by weight liquid chlorinated paraffin is included in the formulation to prevent crumbling or breakout of the dry coating on a fabric. More than about 23% by weight liquid chlorinated paraffin should be avoided to prevent the coating from being excessively tacky and subject to blocking. A liquid chlorinated paraffin content on the order of 13% by weight is preferred.

The resinous chlorinated paraffin may typically have a melt point of between about 90°C. and about 110°C., a specific gravity of between about 1.5 and 1.7, a chlorine content on the order of about 70% by weight and an overall molecular weight of between about 950 and about 1200. Such parameters are not critical, however, and the only truly essential characteristic of the resinous chlorinated paraffin is that it be solid under ambient conditions. The preferred resinous chlorinated paraffins are those sold under the trade designations "Chlorowax 70" and "Chlorowax 70S" by Diamond Alkali Company. Other useful resinous paraffins include those sold under the trade designations "Unichlor I-70AX" and "Unichlor I-70B" by Neville Chemical Company. The resinous chlorinated paraffin component may constitute between about 20% and about 40% by weight of the formulation with a content on the order of 34% by weight being preferred.

The ethylene/vinyl acetate copolymer constituent of the melt formulation serves both to increase the flexibility of the dry finish and to substantially eliminate any perceptible tackiness. The copolymer incorporated in the formulation preferably has a vinyl acetate content of between about 15% and about 40% by weight. Terpolymers of ethylene, vinyl acetate and organic acids may also be utilized. A preferred ethylene/vinyl acetate copolymer having a vinyl acetate content of approximately 18% is that sold under the trade designation "Elvax 410" by E. I. Du Pont de Nemours and Company. Other satisfactory ethylene/vinyl acetate copolymers include those sold under the trade designations "Elvax 210", "Elvax 310" and "Elvax 410" by E. I. Du Pont de Nemours and Company, "EV 1425" by Moore & Munger and "EVA 301", "EVA 401" and "EVA 501" by Union Carbide Corporation. The ethylene/vinyl acetate copolymer may constitute between about 4% and 12% by weight of the melt formulation. A content on the order of 8% by weight is preferred.

A wide variety of fire retardants may be utilized in the formulations of the invention. Antimony trioxide is generally preferred, but various other organic and inorganic fire retardants may be used. Among such useful fire retardants may be mentioned the antimony compound sold under the trade designation "Oncor 75RA" by National Lead Company, the composition sold under the trade designation "Arsonax 2468" by the Humphrey Chemical Co., zinc oxide and the hydrated zinc borates sold by G. S. Robins & Co. The fire retardant preferably constitutes between about 3% and about 18% by weight of the formulation. The optimum fire retardant content may vary somewhat with the identity thereof, but is readily determinable by simple experimentation. Where antimony trioxide is used, it preferably represents on the order of 6% by weight of the formulation.

In addition to the essential components described above, the composition of the invention may preferably but optionally include conventional filler materials, paraffin wax, fungicides, vinyl stabilizers and a limited amount of solvent.

A wide variety of conventional filler materials may be preferably included in the composition, such as for example, calcium carbonate, zinc oxide, kaolin, diatomaceous earth, litharge, mica, talc, alumina, silica, hydrated alumina, montmorillonite, and attapulgite. Particularly useful fillers include a co-fumed leaded zinc containing 10–12% lead sulfate sold under the trade designation "Leaded Zinc Oxide Chemet Grade 101 DG" by Thompson Hayward Chemical Co., kaolin sold under the trade designation "ASP 400" by Merck & Co., Inc. (Mozel Chemical Products Division), diatomaceous silica sold under the trade designation "Celite 281" by Johns-Manville Corporation, litharge supplied by National Lead Company, a mixture of 80% calcium carbonate, 20% diatomaceous silica and traces of alumina and ferric oxide sold under the trade designation "Lorite" by National Lead Company, the English mica supplied by Ashland Chemical Company, the hydrated potassium silicate (muscovite) sold under the trade designation "Mica 3X Mineralite" by Thompson Hayward Chemical Co., the synthetic silicate sold under the trade designation "Micro-cel E" by Johns-Manville Corporation, the ground limestone (Quincy) supplied by Walsh Associates, the zonc oxide sold under the trade designation "Zinc Oxide No. 20" by Neihaus Company, the ground marble containing 92% by weight calcium carbonate, and 3% by weight magnesium carbonate sold under the trade designation "Wingdale White" by G. S. Robins & CO., the ruby talc sold under the trade designation "Talcron 10–68" by Chas. Pfizer & Co., Inc., the pigment containing approximately 43% alumina, 52% silica, 2% titanium dioxide and at trace of iron sold under the trade designation "Burgess Iceburg Pigment" by Ashland Chemical Company and the hydrated aluminas sold under the trade designations "Hydral 705", "Hydral 710" and "Hydral 710S" by Aluminum Company of America. Alkaline filler materials are preferred since in addition to extending the formulations and reducing their initial cost, alkaline fillers function to absorb such hydrogen chloride as may be released from the Chlorowax and prevent the underlying fabric from being tendered or otherwise deteriorated by the hydrogen chloride so released. A particularly effective alkaline filler is that sold under the trade designation Wingdale White. Filler materials also function as u. v. light screeners to further protect the fabric against deterioration. The filler material may constitute up to about 50% by weight of the overall formulation with a content on the order of about 24% by weight being generally preferred.

The presence in the composition of up to 30% by weight paraffin wax is preferred to improve both the water repellency and the nonblocking properties of the formulation. Essentially any paraffin wax having a melt point of between about 124°F. and about 160°F. may be utilized. The optimum paraffin content of the formulation is on the order of 9% by weight.

The composition advantageously includes up to about 3% by weight, preferably on the order of 0.8% by weight, of a fungicide. Among the fungicides which may be utilized in the compositions of the invention are the phenyl mercuric oleate solutions sold under the trade designation "Metasol – 0" by Merck & Co., Inc. (Mozel Chemical Products Division), the mixture of the zinc salt of o-nitroso dehydropiper-idinyl sulfide and the zinc salt of 8-hydroxyquinoline sold under the trade designation Vinyzene 30 by Scientific Chemicals, Inc., copper 8-quinolinolate formulations sold under the trade designations SOCCI 2425 by Scientific Chemicals, Inc. and Copper 8-8000-34 (8029) by Interchem Company, the dehydroabietyl ammonium pentachlorophenoxide sold under the trade designation Rosin Amine D by Wood Treating Chemicals Company, the 50% solution of dihydroxydichlorodiphenylmethane sold under the trade designation Cuniphen No. 2722-40 by Scientific Chemicals, Inc., the zinc magnesium dehydroabietylamine hydroxyquinolinium 2-ethyl hexoate sold under the trade designation Cunimene 2246 by Scientific Chemicals, Inc., the cuprimagnesium dehydroabietyl 8-hydroxyquinolinium 2-ethyl hexoate sold under the trade designation Cunimene 2243 by Scientific Chemicals, Inc., the 10% solubilized copper 8-quinolinolate sold under the trade designation Cunilate 2174 by Scientific Chemicals, Inc., and the copper naphthenates (8% copper) sold under the trade designations Nuodex Copper 8% by Neihaus Company and Copper Naphthenate 8% by Ivan T. Bauman Company.

Minor amounts of organic solvents may be incorporated in the formulation to reduce its melt point and viscosity and increase its ability to penetrate the fabric during coating, so as to maximize both the water-repellency and fire resistance of the finished product. The solvent must be volatile so that it can be driven off in the drying process, but is preferably not excessively volatile. Moisture imperviousness of the dry coated fabric is unsatisfactory if the coating formulation contains more than about 15% by weight solvent. To maximize processing speed, a substantially lower solvent content on the order of 5% by weight is preferred. Solvents which may be used include esters such as ethyl acetate, propyl acetate, isobutyl acetate, n-butyl acetate, methyl amyl acetate, primary amyl acetate, and monoethylether acetate, ethyl-ene glycol, ketones such as methyl isobutyl ketone, methyl isoamyl ketone, ethyl amyl ketone, and diisobutyl ketone, chlorinated solvents such as methylene chloride, 1,1,1-trichloroethane, carbon tetrachloride, ethylene dichloride, trichloroethylene and perchloroethylene, aliphatic naphthas having initial boiling points from about 105°F. to about 470°F. and dry points from about 204°F. to about 505° F., such as for example, those sold under the trade designations Rub-sol, Petrolene, Apcolene, Troluoil, Apco 47-L, Dryolene, Apco 47, Apcothinner, Apco 47-H, Apco 360, Super Stod-Sol, No. 10 Mineral Spirits, Stod-Sol, Apco 42, Wet-Ege Spirits, Apco 140, 42/44 Kerosene, Apco 467 and Apco Inkol No. 0 by APCO Oil Corporation, depolarized aliphatic naphthas, such as for example, those sold under the trade designations Depolarized Apco 125, Depolarized Apco 140 and Depolarized Apco 467 by APCO Oil Corporation, and aromatic naphthas having initial boiling points of between about 176° and about 355°F. and dry points of between about 176 and about 395°F., such as for example, those sold under the trade designations APV Benzol, Dilusol Lite, APV Toluol, Dilusol Heavy, APV Xylol, Apco-Sol 70, APV 100, APV 110, APV 150 and Apco-Sol 350 by APCO Oil Corporation.

The compositions of the invention may also contain up to about 20% by weight, preferably on the order of 0.9% by weight, of a pigment. Pigments also function as fillers for the coating compositions and the sum of the proportions of pigment and other fillers should generally not exceed the 50% by weight proportion recited above. Essentially any pigment may be used such as for example, phthalocyanine blue, chrome yellow, phthalocyanine green and iron oxide.

Optionally, a conventional vinyl stabilizer may be incorporated in the compositions of the invention to inhibit degradation of the chlorinated paraffins and thus to impart heat stability, resistance to aging, and color fastness to the coated material. Typically useful vinyl stabilizers include the barium cadmium zinc complex sold under the trade designation Nuostabe 924 and the organic chelator sold under the trade designation Nuostabe 142 by the Nuodex Division of Tenneco, the epoxidized soybean sold under the trade designation Drapex 6.8 and the barium zinc stabilizer sold under the trade designation Mark RFD by Argus Chemical Corporation. The presence of a vinyl stabilizer is not necessary in the preferred compositions of the invention, but where present may constitute up to about 4% by weight, typically 1.1% by weight, of the coating material.

The compositions of the invention are conveniently prepared by adding the components thereof to an agitated tank and heating to melt or dissolve the resinous chlorinated paraffin and to reduce the overall viscosity of the mixture sufficiently to allow uniform distribution of solid suspended components. Prior to use in coating, the formulation is heated to a temperature at which it may be evenly spread in a thin film on a fabric surface. Preferably, the formulation is brought to flow temperature, i.e., a temperature at which it may be pumped or flow by gravity through pipelines for supply to the surface of a fabric to be coated. Satisfactory processing may be realized using a molten formulation at a temperature in the range of about 170°F. to about 350°F. with an application temperature of about 200°F. being preferred. Where higher proportions of solvent are present, i.e., up to about 15% by weight, the application temperature of the formulation may be as low as approximately 140°F.

Application of the coating compositions to the surface of a fabric may be accomplished by any conventional method. A particularly preferred method is continuous application of the composition with a knife blade coater. In applying the compositions of the invention on a knife blade coating line by the method of the invention, finishing speeds of 5 to 200 yards per minute, typically 90 yards per minute, may be utilized. The higher speeds attainable with this composition and process substantially exceed the 12 to 30 yards per minute rates attainable with oven drying compositions and allow low cost fabrics to be rendered both water-repellent and fir resistant without excessive finishing cost.

The method of the invention is generally illustrated in the accompanying drawing. Shown at 1 is a stack of lapped fabric web supported by pallet 3. The material is drawn through J box 5 in which a sufficient quantity of the material accumulates for the accommodation of surges in the processing rate. From J box 5, the material passes through tension and guiding roll station 7, over drive roll 9, under idler roll 11 and over support plate 12 to a first coating station 13. Coating station 13 is constituted by melt formulation supply 15, knife 17 and return trough 19. Knife 17 is oriented transversely to the direction of movement of the web with the edge of the knife maintaining contact along its length with the upper surface of the web.

From supply 15, the formulation is delivered to the surface of the web immediately upstream of knife 17 with respect to the direction of movement of the web. As the web moves under the knife blade, the knife spreads the formulation uniformly over the surface of the web in a thin substantially uniform film. Excess quantities of the formulation are directed by knife 17 off the sides of the web and are collected in trough 19. Sump pump 21 returns this excess material to a storage tank (not shown) for reuse.

The coated material leaving station 13 passes over idler roll 23, under idler rolls 25 and 27 and over idler roll 29 to a second coating station 31. In passing over rolls 23, 25, 27 and 29, the web is effectively turned over and the side of the web not coated at station 13 is coated at station 31. The arrangement and operation of station 31, constituted by supply 33, knife blade 35 and trough 37 is essentially identical to the operation of station 13. The excess material collected in trough 37 is returned to storage by sump pump 39.

The web leaving station 31, now coated on both sides, passes over idler roll 40 and thence over steam drums 41 and 43 with one side of the web contacting drum 41 and the other side contacting drum 43. Heat transferred from steam supplied to the interior of these drums assists in the drying of the coating by driving off any solvent contained in the coating composition.

The web leaving drum 43 passes through tension and guiding station 45 and thence over idler rolls 47, 49 and 51 and drive roll 53. The distance between station 45 and roll 53 is sufficient to allow cooling and substantially complete the drying of the finish on each side of the web by exposure thereof to ambient conditions. Leaving drive roll 53, the substantially dry web, having a thin adherent fire and water retardant film substantially coating both of its surfaces, passes through tension and guiding station 55, between drive roll 57 and idler roll 59, and is restacked on pallet 61.

The method of the invention may be utilized for the finish treatment of fabrics having a relatively wide range of weight and thread count to produce the novel fire resistant and water-repellent tentage fabric of the invention. Thus, fabrics ranging in weight from 2½ oz. per square yard to 15 oz. per square yard and in fabric count from between 60 by 40 threads per inch to 75 by 65 threads to an inch may be accommodated with the weight of finish typically ranging from about 40% to about 200% of the weight of the fabric. The method is especially advantageous, however, for the application of a water-repellent and fire retardant finish to low weight and low count fabrics, for example a fabric having a weight of 6 oz. per square yard and a fabric count of 68 by 40 threads per inch. The optimum weight of finish for such fabrics is on the order of 67% of the weight of the fabric. The low initial cost of the coating compositions of the invention taken together with the high processing speeds made feasible by the method of the invention, as noted above, allow low weight, low cost fabrics to be rendered fire resistant and water-repellent without excessively adding to their cost.

The following examples illustrate the invention.

EXAMPLE 1

A melt formulation was prepared having the following weight composition:

| Product | Amount in lbs. | % of Total |
| --- | --- | --- |
| Chlorowax 40 | 67.0 | 13.3 |
| Nuostabe V-142 | 6.0 | 1.2 |
| Chlorowax 70 | 177.0 | 35.3 |
| Paraffin (130°F. M.P.) | 48.0 | 9.5 |
| Elvax 410 | 40.0 | 7.9 |
| Antimony Trioxide | 30.0 | 6.0 |
| Hydral 710 | 106.0 | 21.0 |
| Blue Pigment | 5.0 | .9 |
| Wingdale White | 20.0 | 4.0 |
| Cunimene | 5.0 | .9 |
| | 504.0 | 100.0% |

In preparing this formulation, the Chlorowax 40 was added to an oil bath heated mixing tank and the Nuostabe V-142 was added to the Chlorowax 40. The resulting mixture was heated to 250°F. and maintained at this temperature. After the mix reached 250°F., the Chlorowax 70 was sifted into the mixture and allowed to dissolve. Following the Chlorowax 70, the paraffin and Cunimene 2243 were added and then the Elvax 410. After the Elvax 410 had been dissolved, the mixing speed was increased and the antimony trioxide, Hydral 710, and Wingdale White were added. Finally, the blue pigment was added and mixing continued until all the components were uniformly dispersed throughout the melt.

After a uniform melt formulation had been obtained, coating operations were undertaken. A 250 yard web of 6 oz. fabric having a width of 45 inches and a 250 yard web of 6½ oz. fabric having a width of 45 inches were each coated in a two station knife coating line with the molten formulation being pumped out of the mixing tank and delivered to the upper surface of the fabric directly ahead of the knife. The fabric was passed through the coating stations at a speed of 60 yards per minute and the coating formulation was applied at a temperature of 240°F. A finish having an add-on weight of 4.5 oz. per square yard was obtained.

EXAMPLE 2

A melt formulation having the following composition was prepared in a manner similar to that described in Example 1.

| Product | Amount in lbs. | % of Total |
| --- | --- | --- |
| Chlorowax 40 | 67.0 | 14.1 |
| Nuostabe V-142 | 6.0 | 1.3 |
| Chlorowax 70 | 177.0 | 37.3 |
| Paraffin (130°F. M.P.) | 24.0 | 5.1 |
| Elvax 410 | 40.0 | 8.4 |
| Antimony Trioxide | 30.0 | 6.3 |
| Hydral 710 | 106.0 | 22.3 |
| Blue Pigment | 5.0 | 1.1 |
| Wingdale White | 20.0 | 4.1 |
| | 475.0 | 100.0% |

Using a two station knife blade coating line, a web of fabric was coated with the above composition at a speed of about 80 yards per minute and a temperature of 180°F. Due to the relative thickness of the composition, it was poured onto the surface of the fabric rather than pumped. No oven drying was required and the finished fabric had a good appearance and a dry flexible hand. A tent was constructed from the coated fabric and had a good appearance. No problems were encountered in cutting or sewing this tent.

The tent produced in this example was subjected to a number of standard tests both before weathering and after exposure to weather in Florida for periods of 6 weeks, 12 weeks, and 24 weeks, respectively. The tests employed are described below and the results of these tests set forth in Table I, along with comparative results for a nontreated fabric.

Tensile Test

Rectangular specimens were prepared, each having dimensions of approximately 4 in. × 6 in. The longer dimension of each specimen used for warp tests was parallel to the warp and the longer dimension of each specimen used for filling tests was parallel to the filling.

Tests were conducted in a machine provided with two clamps for gripping opposite ends of a specimen and pulling these ends away from each other so as to place the specimen in tension parallel to its other two edges. Each clamp included one gripping surface or jaw as an integral part of the rigid frame of the clamp and a second jaw on a part hinged to a movable member which was in turn attached to the rigid frame. The face of one of the jaws was 1 in. square and the face of the other jaw measured 1 in. × 1½ in. with the long dimension transverse to the direction of application of the load. Each of the jaws of each clamp had a smooth gripping surface and these surfaces were sufficiently parallel to prevent slipping of the specimen during the test. To prevent any cutting action the edges of the jaws were rounded to a radius of not greater than 1/64 inch. The machine was provided with a dial for indication of tension applied.

In the conduct of the test, the ends of each specimen were placed between the jaws of the clamps with the clamps initially set at a distance of 3 inches apart. The machine was then operated to pull the clamps away from each other at a relative speed of 12.0 ± 0.5 inch per minute until the specimen ruptured. The highest force exerted by the machine on the specimen during the test, as indicated by the dial, was recorded as the breaking test of the specimen.

In the table set forth below, the first number entered for tensile strength is the maximum force in pounds per linear inch recorded in the rupture of a sample specimen placed under tension in the warp direction while the second number is the maximum tensile force in pounds per linear inch measured during tests taken in the filling direction.

Flame Resistance Test

Rectangular specimens of coated cloth were prepared having dimensions of approximately three inches by eight inches. The apparatus used in the test included a sheet metal cabinet approximately 13 inches wide, 13 inches deep and 30 inches high provided with a door containing a glass inset for observation of the specimen during exposure to flame. The top closure of the cabinet contained a baffled vent and baffled holes were provided for ventilation purposes near the bottom of the cabinet. A specimen holder was provided inside of the cabinet which was adapted to support the specimen vertically above the flame. The specimen holder included clamps for holding the long edges of the specimen but leaving a center strip 2 inches wide and the lower end of the specimen exposed. A Bunsen burner with a tube 3/8 inch inside diameter, sufficient to furnish a flame 1½ inches high, was located inside the cabinet and equipped with a pilot attachment for lighting.

In the conduct of the test the samples which had not been exposed to weathering were preconditioned for a minimum of four hours at a temperature of 70°C. ± 2°F. and 65 ± 2% relative humidity before exposure to flame. Immediately after removal from exposure to these conditions, each specimen was suspended vertically in the cabinet with the lower end thereof ¾ inches above the top of the gas burner. The burner was then lit and the flame emanating therefrom adjusted to a height of 1½ inches with the air supply completely shut off. The door of the cabinet was closed and the lighted burner moved under the middle of the lower end of the specimen. The flame was applied vertically to the lower end of the specimen for a period of twelve seconds and the burner then withdrawn. As set forth in the table below, the first number listed for the entry after flame is the time in seconds during which the specimen continued to flame after the burner flame was removed, and the second number is the time in seconds during which the specimen continued to glow after the flame was removed.

The first number set forth in the table for char length is the char length in the warp direction after the flame exposure and the second the char length in the filling direction each determined as follows: A hook was inserted in the specimen at one side of the charred area ¼ inch from the nearest outside edge and ¼ inch from the lower end. A weight was then attached to the hook with the size of the weight being sufficient that the total load arising from the combined weight of the hook and the weight was 0.25 lbs. Tearing force was then applied by grasping the lower corner of the cloth on the opposite side of the char from the side on which the load was applied, and gently raising the specimen and weight clear of the specimen support. The distance from the lower end of the specimen, i.e., the end exposed to the flame, to the end of the tear produced by lifting the specimen away from its support was defined as the char length.

Trapezoid Tearing Test

A rectangular specimen was prepared having dimensions of approximately 3 inches by 6 inches with the longer dimension parallel to the warp for warp test, and parallel to the filling for filling test. The specimen of fabric was taken at a distance from the selvage greater than 1/10 the width of the cloth. An isoceles trapezoid having an altitude of 3 inches and bases of 1 and 4 inches, respectively, was marked on each specimen with the aid of a template. A cut approximately ¼ inch in length was made in the center of and perpendicular to the 1 inch edge of the trapezoid.

The test machine described above for tensile tests was also utilized for trapezoid tear tests. Each specimen was secured by attachment of the clamps to the nonparallel edges of the trapezoid with the clamps initially 1 inch apart and the cut halfway between the clamps. In securing the specimen to the clamps, the nonparallel sides of the trapezoid were brought into substantially parallel relationship by allowing the long base of the trapezoid to lie in a fold while the short base was held taught. After the clamps are secured to the nonparallel edges of the trapezoid, the clamps are pulled away from each other at a speed of 12 ± 0.5 inches per minute. The tearing strength of the specimen was the average of the 5 highest peak loads of resistance registered while the clamps were being drawn apart. The first number listed in the table for trapezoid tear is the average peak force in pounds where the specimen was tensioned in the direction of the warp, while the second number listed is the average peak force in pounds where the specimen was tensioned in the direction of the filling.

Crocking of Cloth

This test determines the resistance of a colored cloth to crocking which is defined as the transfer of coloring matter from one piece of cloth to another when the two pieces come in contact.

The test specimens were rectangles of cloth having dimensions of approximately 8 inches by 5 inches. The crocking test was conducted using a crock meter constituted by a wooden base and a sliding crank-operated arm oriented so as to slide back and forth in a straight line across the base with a stroke of 4 inches. The arm terminates in a flat-ended cylindrical finger 0.5 inches in diameter which is arranged to exert a total force of 32 oz. on a piece of cloth clamped to the base of the crock meter.

In the conduct of the test, the specimen to be tested was placed on the base of the crock meter with the shorter dimension of the specimen aligned with the direction of movement of the sliding arm, and located so that the finger on the arm contacted the specimen approximately 1 inch from the longer edge of the specimen. The specimen was placed under sufficient tension to maintain its surface smooth. A 2 inch square of white bleached 80 by 80 white cotton cloth was secured over the flat end of the finger and the finger having the cloth attached thereto was placed on the surface of the specimen and moved back and forth for 10 cycles (20 strokes) at an approximate rate of 1 cycle per second.

Separate crocking tests were conducted using both the wet and dry white cloth secured to the end of the cylindrical finger on the sliding arm of the crock meter. For the wet tests the cloth was saturated with water, squeezed, placed between two sheets of absorbent filter paper and passed through a wringer. The degree of staining of both the dry and wet crock cloths was determined by comparison to the Munsell gray scale. In the table below the first number entered for crock is the Munsell gray scale reading for wet crock cloth, and the second number is the Munsell gray scale reading for dry cloth.

Rain Impact Test

The rectangular test specimen used in this test was approximately 21 inches long and approximately 8 inches wide.

The machine utilized in the rain impact test includes a 88 inch high chamber constructed of solid aluminum sheeting having a level controlled reservoir near the upper end thereof adapted to supply a shower head with a controlled amount of water. The water level in the reservoir is maintained at about ½ inch above the shower head discharge. The shower head is approximately 6 inches by 12 inches in area, and the bottom of the head has 288 1/64th inch diameter holes arranged rectilinearly and spaced ½ inch apart in each direction. A ½ inch rubber hose interconnects the reservoir with the shower head which is fixed directly on the vertical center line of the machine at its top. Near the base of the machine, approximately 5 feet below the shower head, a ridge pole is provided for support of the sample of tentage fabric to be tested. In the conduct of the test, simulated tent roof is formed from the specimen of fabric by placing the specimen over the ridge pole and securing the ends of the specimen with two lead-weighted aluminum jaws.

Before the tests were begun, a seam was sewn 1 inch inward of each of the shorter edges of each test specimen, perpendicular to its longer edges. After the specimen had been placed over the ridge pole and secured by the two aluminum jaws, the test was initiated by opening a valve at the bottom of the reservoir allowing water to pass through the rubber hose and shower head which directs the water downwardly toward the specimen. The specimen was exposed to water emanating from the shower head for 30 minutes. Water penetrating the specimen collected at the bottom of the chamber and passed through the drainage valve into a graduated cylinder provided beneath the test machine.

In the table set forth below, the first number entered for rain impact test is the number of milliliters of water collected over a 30 minute period in the bottom of the test chamber as set forth above. The second entry is the amount of water so collected in a similar test designed to indicate the mist through properties of the tentage fabric. In the latter test, a 6 inches × 14 inches area of the fabric, oriented horizontally, was tensioned over an open-topped square box which in turn was positioned over the drainage valve of the chamber. The conduct of the mist through test was in all other respects identical to the conduct of the impact test using the ridge pole.

Hydrostatic Water Resistance Test

A square specimen of fabric having dimensions of approximately 8 inches by 8 inches was clamped to the bottom of a vertical cylindrical wall well having a diameter of 4.5 inches. The well was then filled with water up to a level 6 inches above the fabric surface and maintained at that level for 10 minutes. The entries for 6 inch hydro in the table below represent the volume of water passing through the fabric specimen in the 10 minute period.

Tongue Tearing Test

A rectangular specimen having dimensions of approximately 3 inches by 8 inches was prepared with the short dimension of the specimen being parallel to the warp for warp tests, and parallel to the filling for filling tests. A 3 inch cut was made at the center of and perpendicular to one of the short sides of the specimen. Using the apparatus described in the tensile strength test, the specimen was clamped along the opposite outside edges of the two tongues formed by the cut. The tearing test was then conducted and the results determined in the same manner as for the trapezoidal tearing test described above. In the table below, the first number entered for tongue tear is the peak average force in pounds measured during warp tests, and the second number is the peak average load in pounds measured during filling tests.

Blocking Tests

To determine the blocking characteristics, i.e., the surface tack of the coated tentage fabric, two specimens each 2 inches × 2 inches in dimension were placed face-to-face between two glass plates with the resulting assemblage being supported by a horizontal surface. A one pound weight was placed on top of the upper glass plate and the assemblage thus compressed was heated in a thermostatically controlled oven for 30 minutes at a temperature of 100°–150°C. After completion of the heating period, the specimens were removed from the oven and exposed to ambient conditions for 15 minutes. The degree of adhesion between the two specimens was then manually and visually inspected.

Four different ratings have been defined for characterization of the blocking characteristics of a particular pair of specimens. A number 1 rating indicates that no blocking was observed and the coating was completely free. Rating N. 2 indicates that no blocking was observed although the coating adhered slightly. Rating No. 3 indicates that slight blocking was observed as indicated by the necessity of peeling the coating to cause separation. Rating No. 4 indicates that blocking problems exist on the basis that the coating could not be spearated intact.

Air Permeability Test

The specimen utilized in the air permeability test is a square sample of cloth having dimensions of approximately 7 inches × 7 inches. This sample of cloth was attached by means of a beveled ring and clamp to the inlet (top) end of a vertical cylindrical chamber approximately 16½ inches long and 6 inches in diameter. The lower end of the chamber was provided with a suction fan for drawing air downwardly through the chamber, and a flow meter orifice was located in the center of the chamber for measuring the amount of air flowing through the chamber during a test. A manometer in communication with the chamber between the fabric specimen and the orifice was provided for determination and adjustment of pressure drop across the fabric during a test. A second manometer was provided to measure the pressure drop across the orifice for determination of air flow during the test. A variable speed motor was provided for the suction fan so that the fan speed and volume of air drawn through the fan could be adjusted continuously over an appropriate range during testing.

In the conduct of the test, the fan was started and the speed thereof adjusted so that the pressure drop across the tentage fabric, as indicated by the manometer in communication with the chamber between the fabric and the orifice, was approximately 0.5 inch $H_2O$. The volume of air permeating the tentage fabric specimen at this pressure drop was then determined by the pressure drop across the flow meter orifice as determined from the second manometer. The air permeability of each specimen in cubic feet per minute is set forth in the table below.

Scrubs Test

In the scrubs test, two specimens of the coated fabric were utilized with one specimen being secured to one jaw and the other specimen to the other jaw of a scrubs testing device. One of these jaws is maintained in a stationary position while the other jaw is on an arm attached to an eccentric, and the two jaws are oriented in such fashion that on turning of the eccentric the surfaces of the fabric specimens are rubbed against each other in a scrubbing fashion. The results as set forth in the table below represent a visual inspection of the fabric to establish whether any apparent deterioration of the fabric surface was observed after a particular number of scrubbing cycles.

Table I

|  | Untreated Material | Treated Material | | | |
|---|---|---|---|---|---|
|  |  | Before Weathering | 6 Week Florida Exp. | 12 Week Florida Exp. | 24 Week Florida Exp. |
| Width | 44¾" | 43⅛" | | | |
| Oz./Sq. Yd. | 6.09 oz. | 12.29 oz. | | | |
| Tensile lbs. | 80/48 | 143/70 | 128/68 | 74/59 | 58/45 |
| Trapezoid Tear | 9.3/7.3 | 10.2/4.9 | 13.8/6.0 | 14.4/8.2 | 8.0/4.0 |
| Tongue Tear | 10.1/8.2 | 5.5/3.2 | 6.9/3.0 | 5.9/3.1 | 5.3/3.2 |
| Thread Count | 69/42 | 68/40 | | | |
| 6" Hydro | Unable to measure - excessive | 1 ml | 3 ml | 0 ml | 45 ml |
| Rain Impact 30 min. | 500/225 M in 7 min. | 3/24 | 10/15 | 41/3 | 75/3 |
| Air Permeability cfm | 93.6 cfm | 1.29 cfm | | | |
| Char. inches | Entire sample consumed | 2.4/2.0 | 4.8/3.2 | 3.1/4.2 | 3.9/2.9 |
| After Flame | | .3/.7 | 1/.8 | 1/0 | 0/0 |
| Blocking at 110°F. 125°F., 175°F. | | Rating No. 1 No Blocking | | | |
| Scrubs 50, 75, 100 | | Good at 50, 75, 100 | | | |
| Crock | | W 8.5/D 7.5 | | | |

EXAMPLE 3

A melt formulation having the following composition was prepared in a manner similar to that described in Example 1.

| Product | Amount in lbs. | % of Total |
|---|---|---|
| Chlorowax 40 | 134.0 | 12.7 |
| Nuostabe V-142 | 12.0 | 1.1 |
| Chlorowax 70 | 354.0 | 33.5 |
| Paraffin (130°F. M.P.) | 96.0 | 9.1 |
| Elvax 410 | 80.0 | 7.6 |
| Antimony Trioxide | 60.0 | 5.7 |
| Wingdale White | 252.0 | 23.9 |
| Blue Pigment | 10.0 | .9 |
| Cuniphen No. 2722-40 | 8.0 | .8 |
| Mineral Spirits | 50.0 | 4.7 |
|  | 1056.0 | 100.0% |

Both sides of a web of fabric were continuously coated with this composition at 90 yards/minute and a temperature of 200°F. using a 2 station knife coating line. Performance tests made on this fabric yielded the following results:

| Width | 44⅛" |
|---|---|
| Oz./Sq. Yd. | 9.91 oz. |
| Tensile lbs. | 103/68 |
| Trapezoid Tear | 9.0/6.8 |
| Tongue Tear | 5.2/4.2 |
| Thread Count | 70 × 39 |
| 6" Hydro | 0 ml |
| Rain Impact 30 min. | 10/8 |
| Air Permeability cfm | 1.57 cfm |
| Char. inches | 4.3/4.1 |
| After Flame | .5 × .5 |
| Blocking at 110°F., 125°F., 175°F. | None |
| Scrubs 50, 75, 100 | Poor |
| Crock | W 8.0/D 7.5 |

Trapezoid tongue tear, 6 inch hydro, rain impact, air permeability, char. inches, after flame, blocking and scrubs results were determined in accordance with the test procedures described in Example 3.

EXAMPLE 4

A melt formulation having the following composition was prepared in a manner similar to that described in Example 1.

| Product | Amount in lbs. | % of Total |
|---|---|---|
| Chlorowax 500 | 67.0 | 14.1 |
| Nuostabe V-142 | 6.0 | 1.3 |
| Chlorowax 70-S | 177.0 | 37.3 |
| Paraffin (130°F. M.P. 2% extractable oil) | 24.0 | 5.1 |
| Elvax 410 | 40.0 | 8.4 |
| Antimony Trioxide | 30.0 | 6.3 |
| Hydral 710 | 106.0 | 22.3 |
| Phthalocyanine Blue | 5.0 | 1.1 |
| Wingdale White | 20.0 | 4.1 |
|  | 475.0 | 100.0% |

Both sides of a web of fabric were knife coated with this composition in the laboratory. A dry, low-cost, water-repellent, mildew resistant, and fire resistant finished product was obtained.

EXAMPLE 5

A melt formulation having the following composition was prepared in a manner similar to that described in Example 1.

| Product | Amount in lbs. | % of Total |
|---|---|---|
| Chlorowax 40 | 134.0 | 9.3 |
| Paraffin (130°F. M.P. 2% extractable oil) | 150.0 | 10.4 |
| Copper-8-quinolinolate | 2.0 | 0.1 |
| Chlorowax 70 | 350.0 | 24.3 |
| Elvax 210 | 80.0 | 5.6 |
| Antimony Trioxide | 100.0 | 7.0 |
| Quincy Limestone | 600.0 | 41.7 |
| Chrome Yellow | 17.0 | 1.2 |
| Phthalocyanine Green | 6.0 | 0.4 |
|  | 1439.0 | 100.0% |

Both sides of a web of fabric were knife coated with this composition in the laboratory. A dry, low-cost, water-repellent, mildew resistant, and fire resistant finished product was obtained.

EXAMPLE 6

A melt formulation having the following composition was prepared in a manner similar to that described in Example 1.

| Product | Amount in lbs. | % of Total |
|---|---|---|
| Chlorowax 40 | 67.0 | 13.9 |
| Nuostabe V-142 | 6.0 | 1.2 |
| Chlorowax 70 | 177.0 | 37.0 |
| Paraffin (130°F. M.P. 2% extractable oil) | 24.0 | 5.0 |
| Elvax 410 | 40.0 | 8.4 |
| Antimony Trioxide | 30.0 | 6.3 |
| Hydral 710 | 106.0 | 22.0 |
| Phthalocyanine Blue | 5.0 | 1.0 |
| Wingdale White | 20.0 | 4.2 |
| Cunimene 2243 | 5.0 | 1.0 |
|  | 480.0 | 100.0% |

Both sides of a web of fabric were knife coated with this composition in the laboratory. A dry, low-cost, water-repellent, mildew resistant, and fire resistant finished product was obtained.

EXAMPLE 7

A melt formulation having the following composition was prepared in a manner similar to that described in Example 1.

| Product | Amount in lbs. | % of Total |
|---|---|---|
| Chlorowax CP-468 | 67.0 | 14.1 |
| Nuostabe V-142 | 6.0 | 1.3 |
| Chlorowax 70-S | 177.0 | 37.3 |
| Paraffin (130°F. M.P. 2% extractable oil) | 24.0 | 5.1 |
| Elvax 410 | 40.0 | 8.4 |
| Antimony Trioxide | 30.0 | 6.3 |
| Hydral 710 | 106.0 | 22.3 |
| Phthalocyanine Blue | 5.0 | 1.1 |
| Wingdale White | 20.0 | 4.1 |
|  | 475.0 | 100.0% |

Both sides of a web of fabric were knife coated with this composition in the laboratory. A dry, low-cost, water-repellent, mildew resistant, and fire resistant finished fabric was obtained.

EXAMPLE 8

Melt formulations having the following compositions were prepared in a manner similar to that described in Example 1:

| | Formulation (Liquid Chlorowax Content) | | | | | | | | | |
|---|---|---|---|---|---|---|---|---|---|---|
| | A (None) | B (2%) | C (15%) | D (40%) | E (30%) | F (35%) | G (20%) | H (22.5%) | I (25%) | J (27%) |
| Chlorowax 40 |  | 18.9 | 162.8 | 614.7 | 395.1 | 498. | 230.5 | 267.7 | 307.3 | 349.7 |
| Nuostabe V-142 | 12. | 12. | 12. | 12. | 12. | 12. | 12. | 12. | 12. | 12. |
| Chlorowax 70 | 354. | 354. | 354. | 354. | 354. | 354. | 354. | 354. | 354. | 354. |
| Paraffin (130° M.P.) | 96. | 96. | 96. | 96. | 96. | 96. | 96. | 96. | 96. | 96. |
| Elvax 410 | 80. | 80. | 80. | 80. | 80. | 80. | 80. | 80. | 80. | 80. |
| Antimony Trioxide | 60. | 60. | 60. | 60. | 60. | 60. | 60. | 60. | 60. | 60. |
| Wingdale White | 252. | 252. | 252. | 252. | 252. | 252. | 252. | 252. | 252. | 252. |
| Blue Pigment | 10. | 10. | 10. | 10. | 10. | 10. | 10. | 10. | 10. | 10. |
| Cuniphen No. 2722-40 | 8. | 8. | 8. | 8. | 8. | 8. | 8. | 8. | 8. | 8. |
| Mineral Spirits | 50. | 50. | 50. | 50. | 50. | 50. | 50. | 50. | 50. | 50. |

Six oz. and 4 oz. tentage fabrics were coated on both sides with each of formulations A through J. Each coating was dried and the coated fabric was checked for stickiness and subjected to scrubs tests as described in Example 2. The results of these observations and tests are set forth in Table II.

Table II

| Formulation | Character of Coating | Scrubs 6 oz. Fabric | Scrubs 4 oz. Fabric |
|---|---|---|---|
| A | Dried immediately | Poor | Poor |
| B | Dried immediately | Poor | Poor |
| C | Remained somewhat tacky | Good | Good |
| D | Very sticky | Too sticky to test | Too sticky to test |
| E | Very sticky | Too sticky to test | Too sticky to test |
| F | Very sticky | Too sticky to test | Too sticky to test |
| G | Stayed somewhat tacky | Good | Some distortion of fibers |
| H | Stayed somewhat tacky | Good | Excessive distortion of fibers |
| I | Very sticky | Too sticky to test | Too sticky to test |
| J | Very sticky | Too sticky to test | Too sticky to test |

EXAMPLE 9

Coating formulations having the following compositions were prepared in a manner similar to that described in Example 1.

| | Formulation (Solvent Content) | | | | | | |
|---|---|---|---|---|---|---|---|
| | A (15%) | B (20%) | C (25%) | D (30%) | E (16%) | F (18%) | G (20%) |
| Chlorowax 40 | 134. | 134. | 134. | 134. | 134. | 134. | 134. |
| Nuostabe V 142 | 12. | 12. | 12. | 12. | 12. | 12. | 12. |

-continued

|  | Formulation (Solvent Content) | | | | | | |
|---|---|---|---|---|---|---|---|
|  | A (15%) | B (20%) | C (25%) | D (30%) | E (16%) | F (18%) | G (20%) |
| Chlorowax 70 | 354. | 354. | 354. | 354. | 354. | 354. | 354. |
| Paraffin (130° M.P.) | 96. | 96. | 96. | 96. | 96. | 96. | 96. |
| Elvax 410 | 80. | 80. | 80. | 80. | 80. | 80. | 147.7 |
| Antimony Trioxide | 60. | 60. | 60. | 60. | 60. | 60. | 60. |
| Wingdale White | 252. | 252. | 252. | 252. | 252. | 252. | 252. |
| Blue Pigment | 10. | 10. | 10. | 10. | 10. | 10. | 10. |
| Cuniphen No. 2722-40 | 8. | 8. | 8. | 8. | 8. | 8. | 8. |
| Mineral Spirits | 177.5 | 251.5 | 335.3 | 431.1 | 191.6 | 220.8 | 268.4 |

Each of these formulations were coated on both sides of both 6 oz. and 4 oz. tentage fabrics. Each coating was dried and the coated fabric subjected to a hydrostatic water-resistance test of the type described in Example 2. The results of these tests are set forth in Table III.

Table III

| Formulation | oz./sq.yd. 4 oz. Material | oz./sq.yd. 6 oz. Material | 6 in. Hydrostat Test 4 oz. Material | 6 in. Hydrostat Test 6 oz. Material |
|---|---|---|---|---|
| A | 7.56 | 10.04 | 9 ml. | 6 ml. |
| B | 7.92 | 10.25 | 248 ml. | 68 ml. |
| C | 7.84 | 9.90 | Excessive | 564 ml. |
| D | 8.46 | 10.69 | Excessive | Excessive |
| E |  |  | Excessive | 910 ml. |
| F |  |  | Excessive | 1184 ml. |
| G |  |  | Excessive | 295 ml. |

In view of the above, it will be seen that the several objects of the invention are achieved and other advantageous results attained.

As various changes could be made in the above products without departing from the scope of the invention, it is intended that all matter contained in the above description or shown in the accompanying drawing shall be interpreted as illustrative and not in a limiting sense.

What is claimed is:

1. A coating composition useful for imparting fire resistance and water-repellency to fabric comprising between about 5% and about 23% by weight of a liquid chlorinated paraffin, between about 20% and about 40% by weight of a resinous chlorinated paraffin, between about 4% and about 12% by weight of a copolymer of ethylene and vinyl acetate, between about 3% and about 18% by weight of a fire retardant, and up to about 15% by weight of an organic solvent.

2. A coating composition as set forth in claim 1 further comprising up to about 30% by weight of a paraffin wax having a melt point of between about 124°F. and about 160°F.

3. A coating composition as set forth in claim 1 further comprising up to about 50% by weight of a filler.

4. A composition as set forth in claim 3 wherein said filler is selected from the group consisting of calcium carbonate, zinc oxide, kaolin, diatomaceous earth, litharge, mica, talc, alumina, silica, hydrated alumina, montmorillonite and attapulgite.

5. A composition as set forth in claim 4 wherein the filler is calcium carbonate.

6. A composition as set forth in claim 3 further comprising up to about 20% by weight of a pigment.

7. A composition as set forth in claim 1 further comprising up to about 3% by weight of a fungicide.

8. A composition as set forth in claim 1 wherein said liquid chlorinated paraffin has a chlorine content of approximately 40% by weight.

9. A composition as set forth in claim 1 wherein said resinous chlorinated paraffin has a chlorine content of approximately 70% by weight.

10. A composition as set forth in claim 1 wherein said copolymer of ethylene and vinyl acetate has a vinyl acetate content of between about 15% and about 40% by weight.

11. A composition as set forth in claim 10 wherein said copolymer contains approximately 18% by weight vinyl acetate.

12. A composition as set forth in claim 2 containing approximately 13% by weight of said liquid chlorinated paraffin, approximately 34% by weight of said resinous chlorinated paraffin, approximately 8% by weight of said ethylene/vinyl acetate copolymer, approximately 6% by weight of said fire retardant, approximately 9% by weight of said paraffin wax, approximately 24% by weight of a filler and approximately 5% by weight of an organic solvent.

* * * * *